May 22, 1962
F. D. HICKEY
3,035,886
METHOD OF STERILIZING
Filed Oct. 7, 1957
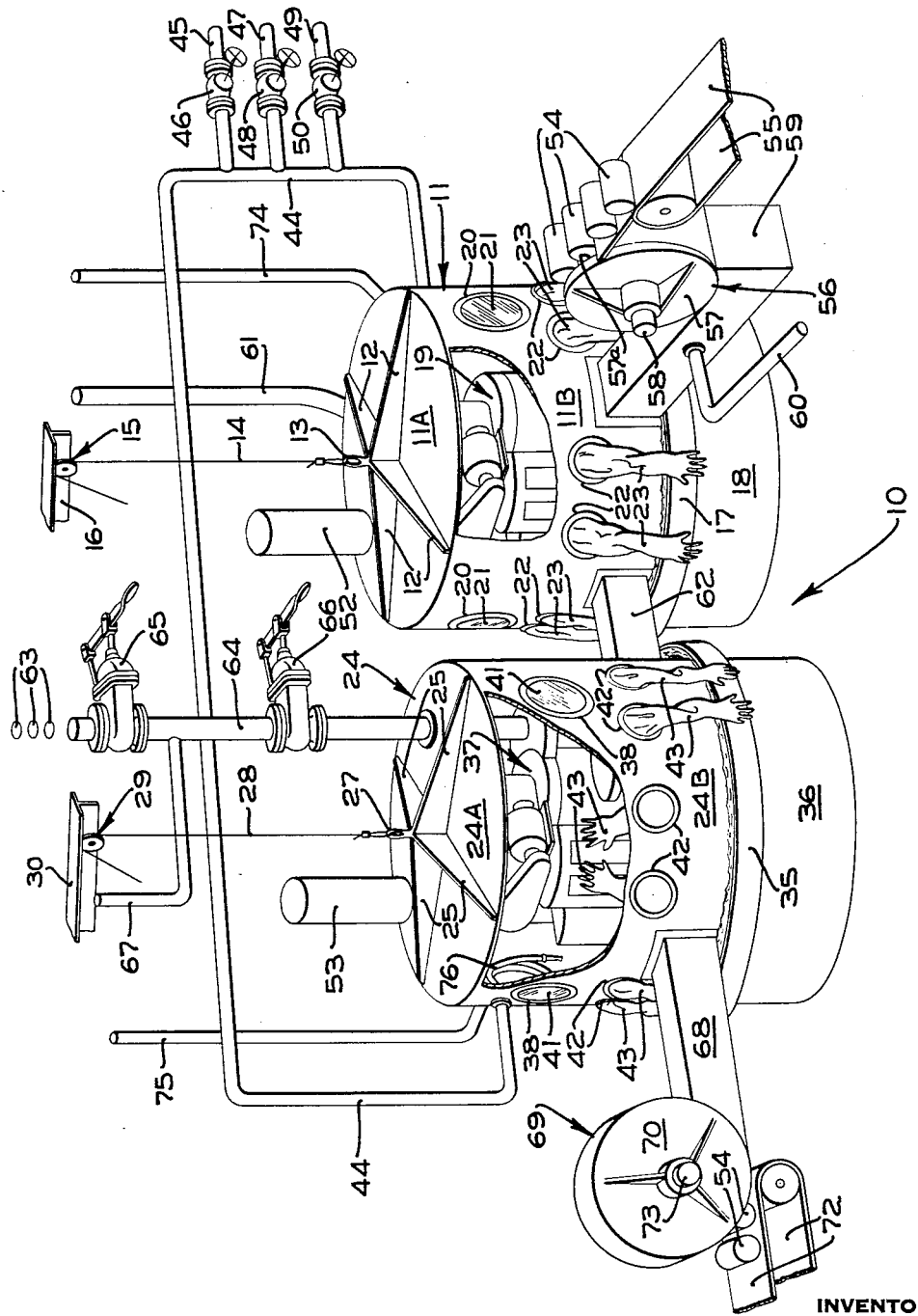
INVENTOR
FRANK D. HICKEY
BY Hans G. Hoffmeister.
ATTORNEY

United States Patent Office 3,035,886
Patented May 22, 1962

3,035,886
METHOD OF STERILIZING
Frank D. Hickey, San Jose, Calif., assignor to FMC Corporation, a corporation of Delaware
Filed Oct. 7, 1957, Ser. No. 688,590
5 Claims. (Cl. 21—57)

The present invention pertains to the aseptic packing of food products in containers, and more particularly relates to a method of aseptic canning and apparatus for carrying out the method.

Aseptic canning processes are carried out in the sterile atmosphere of an enclosure, which contains a container-filling machine and a container-closing machine. A food product in a sterile condition is delivered to the filling machine which packs the pre-sterilized food product into sterile containers. The food-packed containers are then advanced to the closing machine where they are closed and sealed. In aseptic canning operations, it is essential that the filling and closing machines and their surrounding atmosphere be sterilized prior to the packing and sealing operations, and also be maintained in a sterile condition during these operations.

Heretofore, the filling and closing machines have been sterilized with saturated steam. The sterilization of aseptic canning machinery with saturated steam at reasonable temperatures requires a relatively long time and, accordingly, such sterilization is expensive. The time interval for the sterilization of canning equipment can be reduced by increasing the temperature of the saturated steam. However, when the temperature of saturated steam is increased, the pressure thereof increases correspondingly. Consequently, it is necessary to use thick-walled chambers to withstand the increase in pressure. Also, heavily constructed chambers are cumbersome and are expensive to manufacture.

Accordingly, an object of the present invention is to provide an improved method for presterilizing aseptic canning apparatus.

Another object is to provide a method of presterilizing aseptic canning apparatus at substantially atmospheric pressure and thereby avoiding the requirement of an expensive and cumbersome enclosure.

Another object is to provide an aseptic canning apparatus wherein adjustments and repairs can be made without disturbing the sterile atmosphere in the processing chambers.

Another object is to provide aseptic canning apparatus wherein the enclosure thereof is required to withstand substantially atmospheric pressure.

Another object of the present invention is to provide an aseptic canning process wherein the canning machinery employed is sterilized rapidly at substantially atmospheric pressure.

These and other objects and advantages will be apparent from the following description and the accompanying drawing, in which the single FIGURE is a diagrammatic illustration of the aseptic canning installation of the present invention.

In the aseptic canning method of the present invention, the filling and closing machines, together with their enclosing chambers, are presterilized. This accomplished by initially purging the atmosphere within the chambers with saturated steam at substantially atmospheric pressure. Although saturated steam at higher pressures can be employed, it is desirable to use as low a pressure as possible to minimize the cost of construction of the enclosure. The pressure of the steam should be high enough to exceed the atmospheric pressure surrounding the enclosure, thus preventing seepage of unsterile air into the enclosure. Hence, the preferred pressure range for the saturated steam is from 14.7 p.s.i. to 15 p.s.i. It has been determined that generally five minutes of purging time is adequate. However, the precise time required depends upon the size of the enclosure.

After the atmosphere surrounding the filling and closing machines has been purged, the filling and closing machines together with their chambers are sterilized with a mixture of steam at substantially atmospheric pressure and a chemical bactericide. The steam employed in the mixture may be either saturated steam or mildly superheated steam. It is to be observed that the steam employed in the steam-bactericide mixture may be at a pressure substantially higher than atmospheric pressure without detracting from the sterilizing effectiveness of the mixture. For the reasons previously advanced relative to the purging saturated steam, the preferred range for the steam employed in the mixture of steam and a chemical bactericide is from 14.7 p.s.i. to 15 p.s.i.

The chemical bactericides that may be used effectively in the steam-chemical bactericide sterilization are: ammonia, alcohols such as ethyl alcohol, aldehydes, acetaldehyde, volatile acids, chlorine, phenolic compounds, and epoxides. It is to be noted, however, that epoxides, such as propylene oxide and ethylene oxide, are preferred as the chemical bactericide. All of these bactericides are volatile in steam below 212° F.

When the chemical bactericide employed is an epoxide in the steam-epoxide sterilization of aseptic canning apparatus, the preferred concentration of the epoxide in steam is from 10% to 30% by weight. It has been determined that from 10 minutes to 30 minutes of sterilizing time is adequate for steam-epoxide sterilization of aseptic canning apparatus. However, the precise time required depends upon the size of the enclosure.

I have discovered that steam accelerates the lethal action of an epoxide, such as propylene oxide and ethylene oxide, and, thus, reduces the sterilization time. When propylene oxide or ethylene oxide was used at concentrations from 5% to 10% by weight in carbon dioxide, the sterilization time required was several hours, while propylene oxide or ethylene oxide in concentrations from 10% to 30% by weight in steam required less than thirty minutes of sterilization time.

Bacteriological experiments have been performed involving the use of propylene oxide and steam for testing the destruction of flat sour organism #1518 of the National Canners Association. The concentration of propylene oxide in steam was from 10% to 30% by weight with exposures from 10 to 30 minutes. These experiments showed high lethality for the mixture in relatively short time.

Sterilization tests were conducted by placing 75,000 spores of organism #1518 on Petri dishes and then drying them. The dishes were covered so that the mixture had to find its way into a covered dish. The analysis is based on the following equation for integrated sterilization value (I.S.):

$$I.S. = D(\log m - \log s)$$

where $D$ is a constant dependent upon the organism tested and the time required for 90% destruction of the organism.
$m$ = initial count.
$s$ = survivor count.

Intervals from 10 to 30 minutes were used with concentration of propylene oxide in steam of 10%, 20% and 30% by weight. The results are given in Table I.

Table I

| Conditions | Initial Count | Survivors | I.S. |
|---|---|---|---|
| 10 min. 10% propylene oxide | 75,000 | 44 | 6.4 |
| 10 min. 20% propylene oxide | 75,000 | 13 | 7.5 |
| 10 min. 30% propylene oxide | 75,000 | 1.6 | 9.3 |
| 30 min. 10% propylene oxide | 75,000 | 1.25 | 9.6 |
| 30 min. 20% propylene oxide | 75,000 | less than 0.1 | 11.8+ |
| 30 min. 30% propylene oxide | 75,000 | less than 0.1 | 11.8+ |

After the filling and closing machines together with their chambers are sterilized with the mixture of steam and a chemical bactericide, the atmosphere within the chambers is again purged with saturated steam at substantially atmospheric pressure. The source of steam employed may be the same source utilized in the initial purge of the atmosphere within the enclosures. For the reasons previously advanced relative to the initial purge of the atmosphere, the preferred pressure range for the saturated steam is from 14.7 p.s.i. to 15 p.s.i. The second purge of saturated steam continues until the mixture of steam and a chemical bactericide is swept from the enclosures. A sterile water rinse may also be applied to further cleanse the filling and closing machines. It has been determined that generally five minutes of purging time with saturated steam is adequate. However, the precise time required depends upon the size of the enclosure.

Subsequent to the purging of the steam-chemical bactericide mixture from the chambers, a sterile medium, such as sterile air or a sterile inert gas, at substantially atmospheric pressure is conducted into the chambers at a sufficient rate of flow for the maintenance of asepsis. Although higher pressures may be employed for the sterile medium, the pressure range preferred for reasons previously advanced is from 14.7 p.s.i. to 15 p.s.i.

Upon completion of the presterilization of the filling and closing machines together with their enclosing chambers, containers and a food product are advanced to the filling machine. Simultaneously, lids are advanced to the closing machine. While the containers and lids are advanced to the enclosures of the filling and closing machines, respectively, they are sterilized by being exposed to saturated steam at slightly above atmospheric pressure. Generally, the pressure range of the saturated steam for sterilizing the lids and containers would be from 15 p.s.i. to 40 p.s.i. However, the precise pressure of the saturated steam, of course, depends upon the condition of the lids and containers. The food product is presterilized and, hence, it is in a sterile condition prior to advancement to the filing chamber. The food product under sterile conditions is packed into the sterilized containers and the food-packed containers are then sealed with sterile lids. During the filling and sealing operations, sterile air or sterile inert gas continues to flow into the filling and closing enclosures so that the packing and sealing operations are performed in a sterile atmosphere.

The aseptic canning apparatus 10 employed in the aseptic canning process of the present invention comprises a filling machine enclosure or housing 11 which is open at the bottom and closed at the top and has a cylindrical configuration. The enclosure 11 is made of suitable light sheet metal material, since it is only required to withstand pressures at substantially atmospheric pressure. Fixed to the top wall 11A of the enclosure 11 are radially extending ribs 12 having an eyebolt 13 projecting upwardly at the point of intersection of the ribs. Secured to the eyebolt 13 is a suitable cable 14 that supports the enclosure 11 from an overhead lift mechanism 15 secured to a beam 16 or the like. The side wall 11B of the enclosure projects downwardly into an annular trough 17 formed in an open-top cylindrical drum 18 which has a sterile liquid, such as sterile water, therein to provide a liquid seal at the lower end of the enclosure. The drum 17 may rest on the floor or any suitable support surface.

While the preferred embodiment shows a liquid seal for the lower end of the enclosure 11 other suitable means may be employed to seal the lower end of the enclosure. A conventional product filling machine 19 and auxiliary maintenance equipment are mounted within the enclosure 11.

To enable an operator to check and observe the operation of the filling machine 19 without disturbing the sterile atmosphere within the enclosure 11, port openings 20 are formed in the wall 11B of the enclosure at convenient observation positions therearound. Disposed within the port openings 20 in an airtight manner are panes 21 of glass or other suitable transparent material. In addition, a pair of access ports 22 are formed in the wall 11B at a convenient distance below each observation pane 21. Fixed within each pair of access ports 22 in an airtight manner is a pair of gloves 23. Thus, an operator can make the necessary repairs and clear the jamming of equipment with sterile tools without disturbing the sterile atmosphere within the enclosure 11.

The canning apparatus 10 also includes a closing machine enclosure 24 which has a cylindrical configuration and is disposed adjacent the filling machine enclosure 11. The enclosure 24 is closed at the top and open at the bottom and is made of suitable light sheet metal material, since it is required to withstand pressures at substantially atmospheric pressure. Fixed to the top wall 24A of the enclosure 24 are radially extending ribs 25 having an eyebolt 27 projecting upwardly at their intersections. Secured to the eyebolt 27 is a cable 28 that is part of a lifting mechanism 29 which supports the enclosure from an overhead structure 30. A side wall 24B of the enclosure 24 projects downwardly into an annular trough formed in an open-top drum 36 which has a sterile liquid, such as sterile water, therein to provide a liquid seal for the bottom of the enclosure 24. The drum 36 rests upon the floor or any suitable supporting surface. While a liquid seal is disclosed, other suitable seals may be employed. A conventional container closing machine 37 and auxiliary maintenance equipment are mounted within the enclosure 24.

Port openings 38 are formed in the side wall 24B of the enclosure 24 at convenient observation positions therearound. Sealed within the port openings 38 are panes 41 of glass or other suitable transparent material. A pair of access openings 42 is formed in the wall 24B at a convenient distance below each pane 41. A pair of gloves 43 is fixed within each pair of access ports 42 in an airtight manner. Thus, an operator can make the necessary repairs and clear the jamming of equipment within the enclosure 24 with sterile tools without disturbing the sterile atmosphere thereof.

For presterilizing the aseptic canning apparatus 10, a manifold 44 is connected to the enclosures 11 and 24. Communicating with the manifold 44 is a steam supply conduit 45 having a control valve 46. Either saturated steam or superheated steam may be conducted through the conduit 45 for delivery to the enclosures 11 and 24 through the manifold 44. Also, communicating with the manifold 44 is a conduit 47, which includes a control valve 48. Through the conduit 47 is conducted the mixture of steam and a chemical bactericide, such as steam-epoxide mixture, which flows through the manifold 44 for delivery to the interior of the enclosures during the presterilizing operation. In addition, a conduit 49 having a valve 50 is connected to the manifold 44 to conduct either sterile air or a sterile inert gas to the manifold 44 for delivery to the interior of the enclosures 11 and 24. The sterile air or sterile inert gas is delivered to the interior of the enclosures upon completion of the sterilization of the aseptic canning apparatus 10 and continues to flow during the filling, closing and sealing operations in order to maintain an aseptic atmosphere. Vents 52 and 53 are provided in the tops of the enclosures 11 and 24, respectively, to provide an escape outlet for steam and gases. When the bottoms of the enclosures are provided with liquid seals, the atmospheric pressure within the enclosures should not exceed the liquid pressure in the annular troughs 17 and 35, respectively, which liquid pressure is determined by the height of the liquid on the trough.

Containers 54 are advanced on a suitable conveyor 55 to a transfer valve 56. The transfer valve 56 includes pockets or compartments formed along the peripheral edge of a feed wheel (not shown) which is disposed inside the casing 57 of the transfer valve. A suitable opening 57a is formed in the casing 57 so that only one pocket at a time is in registry with the opening. Suitable means, not shown, rotate a shaft 58, which, in turn, rotates the compartmented feed wheel to deposit the containers 54 into an airtight passageway provided by a housing 59. The housing 59 has an end portion sealed in an opening in the wall 11B so that the passageway, provided by the housing, communicates with the interior of the enclosure 11. Within the passageway are suitable means, not shown, for advancing the containers 54 into the filling machine. Connected to the housing 59 is a conduit 60 that conducts saturated steam into the passageway in the housing 59 for exposing the containers 54 to a sterilizing atmosphere as they are advanced into the enclosure 11. With this arrangement, the containers 54 are sterilized as they are advanced to the filling machine 19.

It is to be observed that the saturated steam in the passageway in housing 59 does not escape through the transfer valve 56, since the pocket of the feed wheel that is in registry with the passageway is not in communication with the inlet opening 57a of the valve 56. Likewise, the entry of unsterile air through the conduit 60 is negligible, since the casing opening 57a is in registry with only one compartment at a time.

A product conduit 61 is connected to the enclosure 11 in an airtight manner and is arranged to have a presterilized food product pass therethrough. The presterilized food product is delivered to the filling machine 19, which packs the presterilized food product into the sterile containers 54. After being filled, the containers are advanced from the enclosure 11 to the enclosure 24 through an airtight conduit 62. The conduit 62 is received in sealed relation in openings in the walls 11B and 24B of the enclosures 11 and 24, respectively.

Container lids or covers 63 are advanced to the enclosure 24 of the aseptic canning apparatus 10 through a conduit 64 having therein lid-admitting valves 65 and 66. The conduit 64 passes through the top wall 24A of the enclosure 24 and communicates with the closing machine 37. A conduit 67 for conducting saturated steam is connected to the conduit 64 between the lid-admitting valves 65 and 66. In operation, the lid-admitting valve 65 is first actuated to permit the lids to advance in the conduit 64 to the lid-admitting valve 66. During this period of advancement, the lids 63 are exposed to the sterilizing atmosphere of saturated steam. After the lids are sterilized, the lid-admitting valve 66 is actuated to permit the lids 63 to advance to the closing machine 37. Thus, the lids 63 are delivered to the closing machine 27 in a sterile condition with a negligible escape of steam through the conduit 64.

After the closing machine 37 seals the food-packed containers with the lids 63, the sealed containers are advanced by suitable means, not shown, through an airtight conduit 68 to a transfer valve 69. The conduit 68 is connected at one end in the wall 24B of the enclosure 24 in an airtight manner and at the other end communicates with the transfer valve 69. The transfer valve 69 has a feed wheel (not shown) disposed in a housing 70. The wheel has pockets or compartments formed along the peripheral edge thereof. A suitable discharge opening (not shown) is formed in the housing 70 so that one pocket at a time may come into registry therewith. Suitable means, not shown, are provided to rotate a shaft 73 of the valve 69, which, in turn, rotates the wheel to bring the pockets successively into registry with the discharge opening so that the sealed containers may be discharged one at a time onto a conveyor 72. Since the discharge opening of valve 69 can register with only one pocket at a time, only a negligible amount of unsterile air can enter the conduit 68 through the transfer valve 69. The conveyor 72 advances the sealed containers to a suitable loading platform, not shown.

Connected to the enclosure 11 and to the enclosure 24 are conduits 74 and 75, respectively, which conduct sterile rinse water to the interior of the enclosures. Connected to the conduits 74 and 75 are suitable hoses 76, only one being shown, which are disposed in the enclosures and are accessible to the operator.

In carrying out the process of aseptic canning of food products in containers, the aseptic canning apparatus 10 is presterilized. This is accomplished by opening the control valve 46 in the steam supply conduit 45 to cause the saturated steam to flow into the filling enclosure 11 and into the closing enclosure 24 through the manifold 44. The flow of saturated steam purges the atmosphere within the enclosures 11 and 24. After the atmosphere within the enclosures is purged, the control valve 46 is closed. Thereupon, the control valve 48 in conduit 47 is opened, causing the mixture of steam and a chemical bactericide to flow into the filling enclosure 11 and into the closing enclosure 24 through the manifold 44. The steam-chemical bactericide mixture is permitted to circulate in the enclosures until the aseptic canning apparatus is sterilized. When the filling machine 19 and the closing machine 37, together with the surrounding atmosphere, are sterilized, the valve 48 is closed. Then, the valve 46 in conduit 45 is again opened, permitting saturated steam to flow once more into the enclosures 11 and 24. The flow of saturated steam into the enclosures purges the atmosphere contained therein, and sweeps the mixture of steam and a chemical bactericide out of the enclosures through the vents 52 and 53. After the enclosures have been purged, the valve 46 is closed to shut off the supply of saturated steam and the valve 50 in conduit 49 is opened. The opening of valve 50 causes sterile air or sterile inert gas to flow into the enclosures 11 and 24 through the manifold 44. The flow of sterile air or sterile inert gas into the enclosures is continued during the filling and sealing operations in order to maintain an aseptic atmosphere within the enclosures.

After the aseptic canning apparatus 10 has been presterilized, the filling operation begins with the containers 54 being advanced to the transfer valve 56. The transfer valve 56 transfers the containers 54 from the conveyor 55 to the passageway in housing 59, wherein the containers are advanced to the filling machine 19. During the time the containers 54 are in the passageway, steam is conducted from the conduit 60 into the passageway to expose the containers 54 to a sterilizing atmosphere. Hence, the containers 54 are sterilized as they are advanced to the filling machine 19.

Simultaneously with the advancing of the containers 54 to the filling machine 19, a presterilized food product is conducted in the conduit 61 to the filling machine 19. The filling machine 19 packs the presterilized food product into the sterile containers 54. The food-packed containers are then advanced through the passageway 62 into the enclosure 24 for delivery to the closing machine 37.

While the food-packed containers are advanced to the closing machine 37, a supply of lids 63 is disposed in the conduit 64. The lid-admitting valves 65 and 66 are actuated to deliver a supply of lids to the closing machine 37. During the time the lids advance from valve 65 to valve 66, they are exposed to an atmosphere of saturated steam conducted to the conduit 64 by the conduit 67. Thus, the lids 63 are sterilized as they are advanced to the closing machine 37 in enclosure 24. The closing machine 37 seals the food-packed containers with the sterilized lids 63 and the sealed containers are then advanced through the conduit 68 to the transfer valve 69 which transfers the sealed containers to the conveyor 72 on which they are carried to a loading platform, not shown.

Whereas, the preferred embodiment of the present invention shows two aseptic enclosures, it is to be understood that the aseptic canning method of the present invention can be performed in a single or unitary chamber containing the packing and sealing machines. Although steam-chemical bactericide sterilization, such as steam-epoxide sterilization, is described in connection with the canning apparatus in the enclosures, it is apparent that the sterilization process can be applied to other articles such as containers and lids.

It will be understood that modifications and variations of the embodiments of the invention disclosed herein may be resorted to without departing from the spirit of the invention and the scope of the appended claims.

Having thus described my invention, what I claim as new and desire to protect by Letters Patent is:

1. A method of sterilizing a canning machine within a sealed chamber comprising the steps of, purging the atmosphere within the chamber with steam at substantially atmospheric pressure, exposing the machine and the atmosphere within the chamber to a mixture of steam and propylene oxide at substantially atmospheric pressure for a sufficient period of time to sterilize the machine, purging the mixture of steam and propylene oxide from the atmosphere within the chamber with steam, and conducting a sterile fluid medium into the chamber for the maintenance of asepsis.

2. A method of sterilizing a canning machine within a chamber comprising the steps of, purging the atmosphere within the chamber with steam at substantially atmospheric pressure, exposing the machine and the atmosphere within the chamber to a mixture of ethylene oxide in saturated steam for a sufficient period of time to sterilize the machine, purging the mixture of ethylene oxide in steam from the atmosphere within the chamber with steam at substantially atmospheric pressure, and conducting a sterile fluid medium at substantially atmospheric pressure into the chamber for the maintenance of asepsis.

3. A method of sterilizing a canning machine within a chamber comprising the steps of, purging the atmosphere within the chamber with steam at substantially atmospheric pressure, exposing the machine and the atmosphere within the chamber to a mixture of steam at substantially atmospheric pressure and propylene oxide for from 10 to 30 minutes to sterilize the machine, the concentration of said propylene oxide in steam being from 10% to 30% by weight, purging the mixture of propylene oxide in steam from the atmosphere within the chamber with steam at substantially atmospheric pressure, and conducting a sterile fluid medium at substantially atmospheric pressure into the chamber for the maintenance of asepsis.

4. A method of sterilizing apparatus within a chamber comprising the steps of purging the atmosphere within the chamber with steam at substantially atmospheric pressure, exposing the apparatus and the atmosphere within the chamber to a mixture of steam and a chemical bactericide selected from the group consisting of bactericidal aldehydes, epoxides, alcohols, and volatile acids having boiling points below 212° F. for a sufficient period of time to sterilize the machine, purging the mixture of bactericide in steam from the atmosphere within the chamber with steam at substantially atmospheric pressure, and conducting a sterile fluid medium at substantially atmospheric pressure into the chamber for the maintenance of asepsis.

5. A method of sterilizing apparatus within a chamber comprising the steps of purging the atmosphere within the chamber with steam at substantially atmospheric pressure, exposing the apparatus and the atmosphere within the chamber to a mixture of steam and a chemical bactericide volatile in steam below 212° F. and selected from the group consisting of bactericidal epoxides, alcohols, and volatile acids for a sufficient time to sterilize the machine, purging the mixture of bactericide and steam from the atmosphere within the chamber with steam at substantially atmospheric pressure, and conducting a sterile fluid medium at substantially atmospheric pressure into the chamber for the maintenance of asepsis.

References Cited in the file of this patent

UNITED STATES PATENTS

| 903,853 | Gartner | Nov. 17, 1908 |
| 1,594,631 | Ross | Aug. 3, 1926 |
| 1,926,579 | Burgess | Sept. 12, 1933 |
| 2,268,289 | Kronquest | Dec. 30, 1941 |
| 2,338,227 | Boeckeler et al. | Jan. 4, 1944 |
| 2,370,768 | Baerwald | Mar. 6, 1945 |
| 2,514,027 | Clifcorn et al. | July 4, 1950 |
| 2,575,863 | Clifcorn | Nov. 20, 1951 |
| 2,628,887 | Perkins | Feb. 17, 1953 |
| 2,695,743 | Wetherby-Williams | Nov. 30, 1954 |
| 2,839,355 | George | June 17, 1958 |
| 2,855,314 | Martin | Oct. 7, 1958 |

FOREIGN PATENTS

| 53,059 | Denmark | May 10, 1937 |